United States Patent [19]

Kloppe et al.

[11] 4,410,211
[45] Oct. 18, 1983

[54] MOTOR VEHICLE BODY WITH CONCEALED DRIP RAIL

[75] Inventors: Herbert Kloppe, Pulheim; Heinz Rest, Cologne; Erwin Spiegel, Bergheim, all of Fed. Rep. of Germany

[73] Assignee: Ford Motor Company, Dearborn, Mich.

[21] Appl. No.: 228,851

[22] Filed: Jan. 27, 1981

[30] Foreign Application Priority Data

Jan. 30, 1980 [DE] Fed. Rep. of Germany ....... 3003216

[51] Int. Cl.³ ............................................. B62D 25/06
[52] U.S. Cl. .................................... 296/213; 224/331; 224/329
[58] Field of Search ................. 296/213, 154; 49/476, 49/485; 224/309, 314, 322, 325, 326, 329, 330, 331

[56] References Cited

U.S. PATENT DOCUMENTS

| 2,937,047 | 5/1960 | Hezler et al. | 296/213 |
| 3,118,701 | 1/1964 | Peras | 296/213 |
| 3,550,950 | 12/1970 | Pollock | 296/213 |
| 3,596,980 | 8/1971 | Cadiou | 296/154 |
| 3,711,147 | 1/1973 | Higuchi et al. | 296/213 |
| 3,892,439 | 7/1975 | Götz | 296/213 |
| 4,036,522 | 7/1977 | DeRees et al. | 296/154 |
| 4,304,435 | 12/1981 | Everts et al. | 296/213 |

FOREIGN PATENT DOCUMENTS 1292277 10/1972 United Kingdom ............... 296/154

*Primary Examiner*—Robert R. Song
*Assistant Examiner*—Dennis Pedder
*Attorney, Agent, or Firm*—John J. Roethal; Daniel M. Stock; Clifford L. Sadler

[57] ABSTRACT

The invention relates to a motor car body with concealed drip moulding arrangement, whereby a rain channel formed from a fold in the edge of a roof-plate, possibly connected with a part of an internal and/or external side wall plate is covered in the side view by the edge of an adjacent pivotable door or a fixed cover.

3 Claims, 13 Drawing Figures

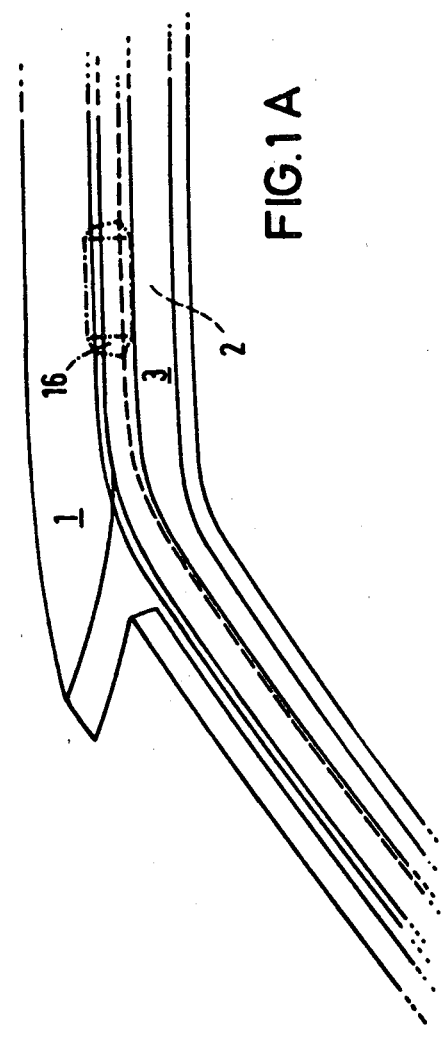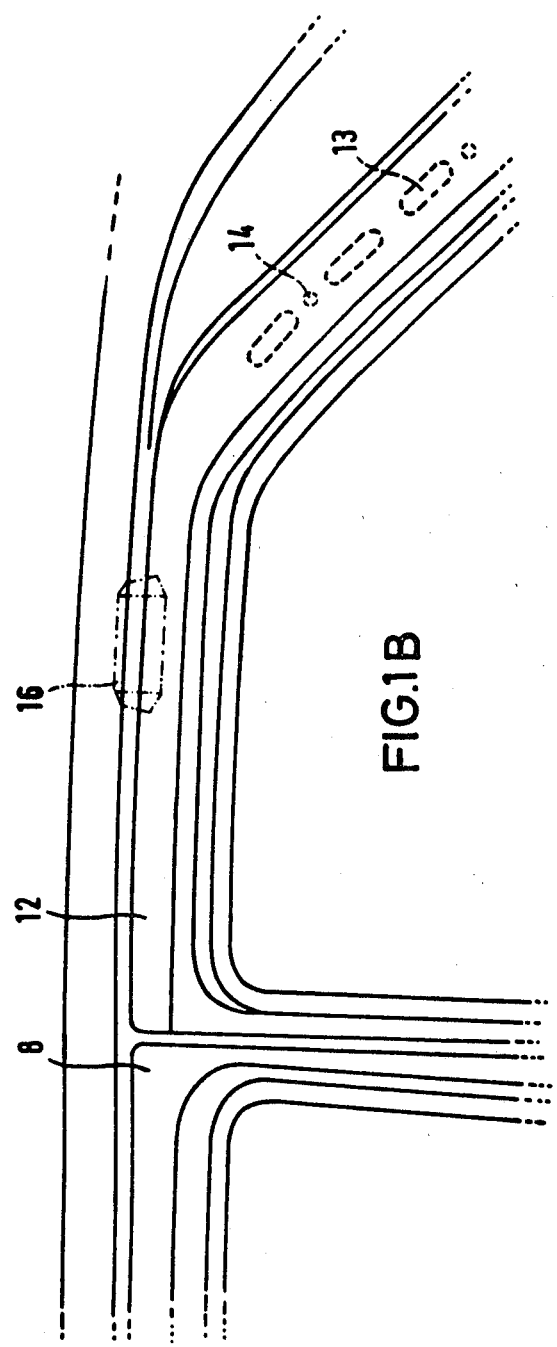

MOTOR VEHICLE BODY WITH CONCEALED DRIP RAIL

FIELD OF THE INVENTION

This invention relates to a motor car body with a concealed drip moulding arrangement.

BACKGROUND OF THE INVENTION

A motor car body of the type mentioned above is known from German Gebrauchsmuster (Design Patent) No. 68 08 025, in which a large number of possible embodiments of the area comprising the roof edge, the rain channel and the door are indicated.

However, no guidance can be drawn from the above mentioned document as to how an extended solution in the area of a fixed window in the side wall of the motor car, for example in the case of a two-door car, might look. In addition no consideration has been given to supporting a roof-rack on this kind of concealed drip moulding arrangement.

A further motor car body with concealed drip moulding arrangement is known from German laid-open Pat. No. 19 20 220 in which likewise neither the problem of a fixed window in the side wall of the car nor the problem of supporting a roof-rack was considered.

SUMMARY OF THE INVENTION

It is the function of the invention to complement a car body of the type mentioned above in such a way that a stylistically unobjectionable extension of the concealed drip moulding arrangement provided in the area of the car door is achieved in the area of a fixed window in the side wall of the car. In addition it seeks to present a simple and safe solution to the problem of supporting a roof rack with this kind of concealed drip moulding arrangement.

According to the invention this function is fulfilled if a car body with concealed drip moulding arrangement based, for example, on FIG. 3 of the German Design Pat. No. 68 08 025 in the area of a fixed window in the side wall of the car includes an extension of the drip channel formed from a welded flange carried on a portion of the side wall, the extended channel being masked by a cover carried on the channel welded flange.

By extending the rain channel in the area of a fixed window in the side wall of the car in the same way as in the area of the door, and by concealing it with a cover which can be attached to the rain channel and is supported with its lower longitudinal edge on a projecting longitudinal edge of the external side wall, the essential advantage is achieved that in a certain model of car a similar roof plate can be used for both two-door and four-door types of bodywork. In addition this embodiment offers the advantage that a single external side wall sheet can be used.

The cover attached to the rain channel can here advantageously be extended to the foot of the C-upright and cover the vents disposed in this area.

By means of recesses backed with screwed plates disposed at intervals in the roof-plate, plastic fillers complementing the roof-edge line may be clipped in if desired or supports for the feet of a roof-rack can be screwed tight.

The cover can thus be painted or coated to match or contrast with the colour of the bodywork in the peripheral area of the car door.

It is here appropriate for the cover to be in the form of a plastic part.

DESCRIPTION OF THE DRAWINGS

The invention is described in greater detail with the aid of the embodiments illustrated in the accompanying drawings. Shown in FIG. 1A is a side view of an A-upright—roof frame area;

FIG. 1B is a side view of an upright—roof frame area showing the B-upright on the left and the C-upright on the right;

DETAILED DESCRIPTION OF THE INVENTION

Figure 2:
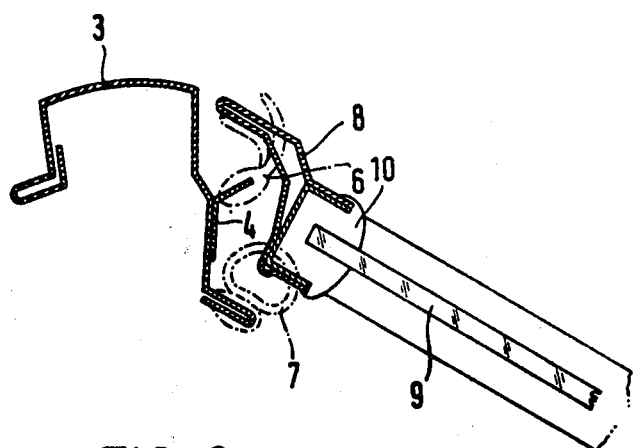
FIG. 2 is a section through the A-upright and the door frame.
Figure 3:
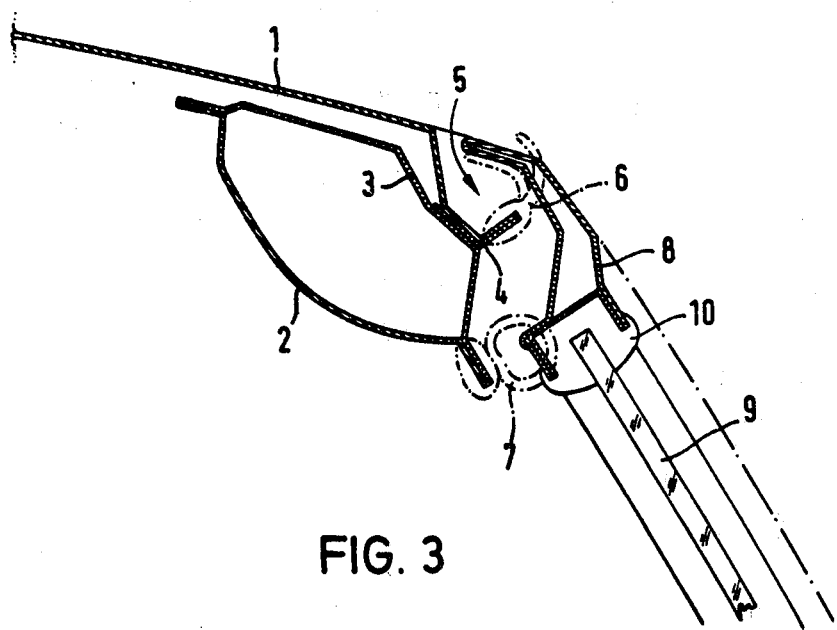
FIG. 3 is a section through the roof frame and the door frame.

The upright—roof frame—area of a car body shown in FIGS. 1A and 1B consists essentially of a roof plate 1, an internal side-wall plate 2 and an external side-wall plate 3.

As can be seen in the FIGS. 2 to 6, which show vertical sections through the A-upright, the roof frame in the door area, the roof frame in the area of the fixed window, the B-upright and the C-upright, the known concealed drip-moulding arrangement consists essentially of a welded flange made up of an edge of the roof plate 1 and a reinforcing plate 4, which forms a rain channel 5. On the welded flange is attached for example a lip-type sealing strip 6. On the welded flange formed by the inner side wall plate 2 and the outer side wall plate 3 is attached for example a combined edge protection and hose sealing strip 7.

The two sealing strips 6 and 7 cooperate in known fashion with an edge 8 of a car door in which a slidable pane 9 is fixed in a window guide 10. The edge 8 of the car door can here be in the form of either a sheet metal moulding or a section moulding.

Figure 4:
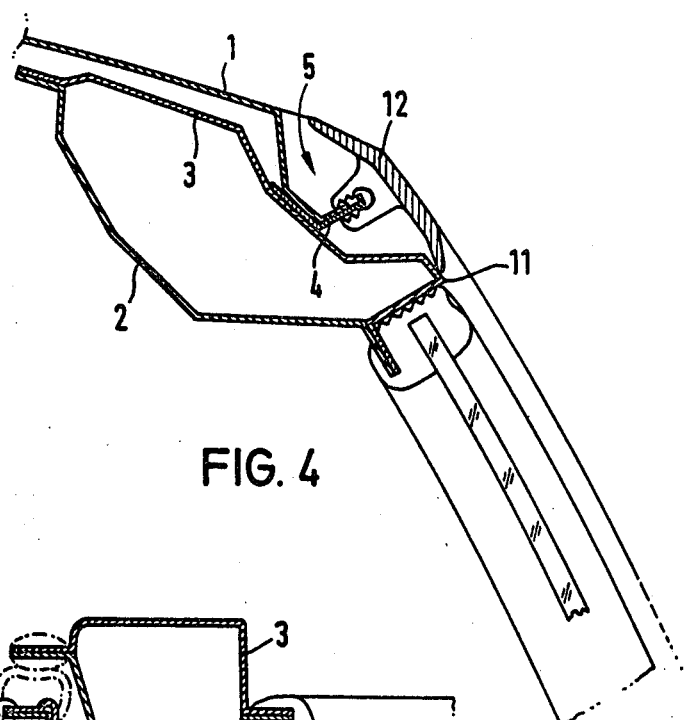
FIG. 4 is a section through the roof frame in the area of the fixed window in the side wall of the car.
Figure 5:
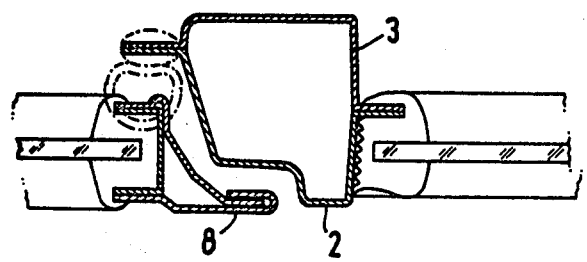
FIG. 5 is a section through the B-upright and the door frame the fixed window.
Figure 6:
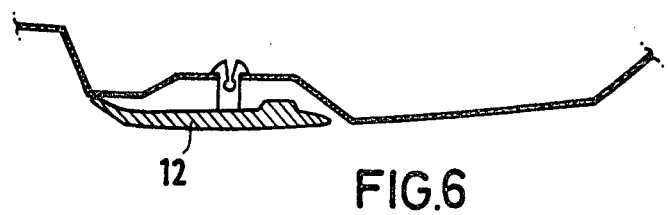
FIG. 6 is a section through the C-upright.

The object of the invention can be seen from FIG. 4. In the area of the fixed window the outer side wall plate 3 is provided with a projecting longitudinal edge 11. A cover 12 made of plastic or the like attached to the edge of the roof plate 1 and the reinforcing plate 4 is supported by its lower longitudinal edge on the projecting longitudinal edge 11 of the outer side wall plate 3.

As can best be seen from the area of the roof frame at the B-upright, the cover 12 forms a stylistically extended connection to the frame 8 of the car door.

The cover 12 can preferably be taken down along the C-upright. The extended cover 12 can conceal in this area vents 13 which can be disposed in the outer side wall plate 3. Since the welded flange is no longer available for attaching the covering strip 12 in this area, the extended cover 12 is here fixed to the outer side wall plate by appropriate clips 14.

Although in certain applications a cover 12 combined with a cover for C-upright vents can be very suitable, in certain circumstances other designs may be more favourable in many respects.

Figure 11:
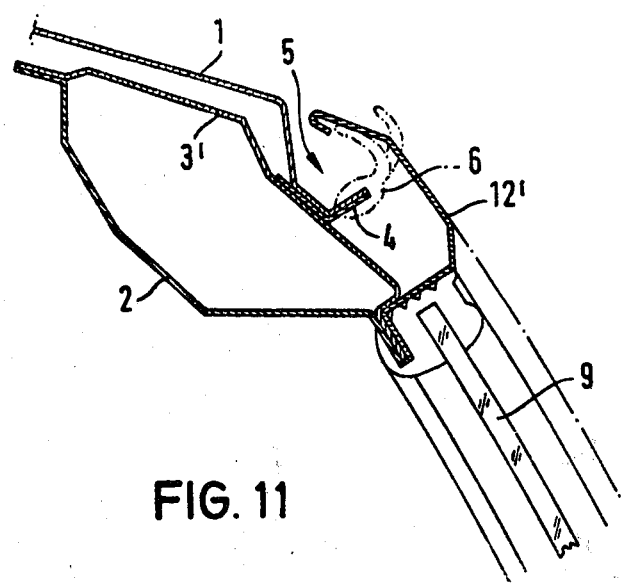
FIG. 11 is a section similar to FIG. 4 with a different embodiment of the cover.

Thus the embodiment shown in FIG. 11 of a cover 12' is made of sheet metal connected with the internal flange of the window is more favourable with regard to the pressing of the outer wall plate 3.

Figure 12:
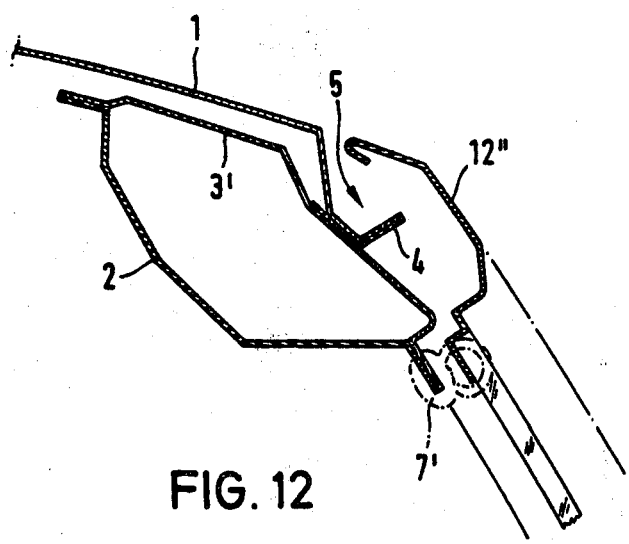
FIG. 12 is a section similar to FIG. 4 with a different embodiment of the cover.

The embodiment of a cover 12" shown in FIG. 12 is designed in such a way that it forms a ventilatable frame for the fixed window which is supported by a sealing strip 7' on the internal flange of the window.

In order to be able to fix a roof rack onto this kind of drip moulding arrangement the roof plate 1 is provided with recesses 16 backed by screwed plates 15, indicated in FIGS. 1A and 1B with dotted lines.

Figure 8:
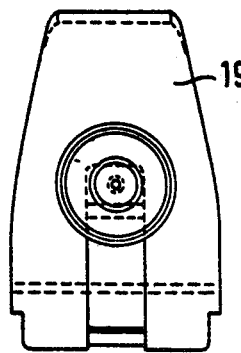
FIG. 8 is a view of the support.

In these recesses 16 backed by screwed plates 15 or the like, fillers 17 (see FIG. 10) can optionally be clipped in or supports 18 (see FIG. 8) can be screwed in for the use of a roof rack.

Figure 7:
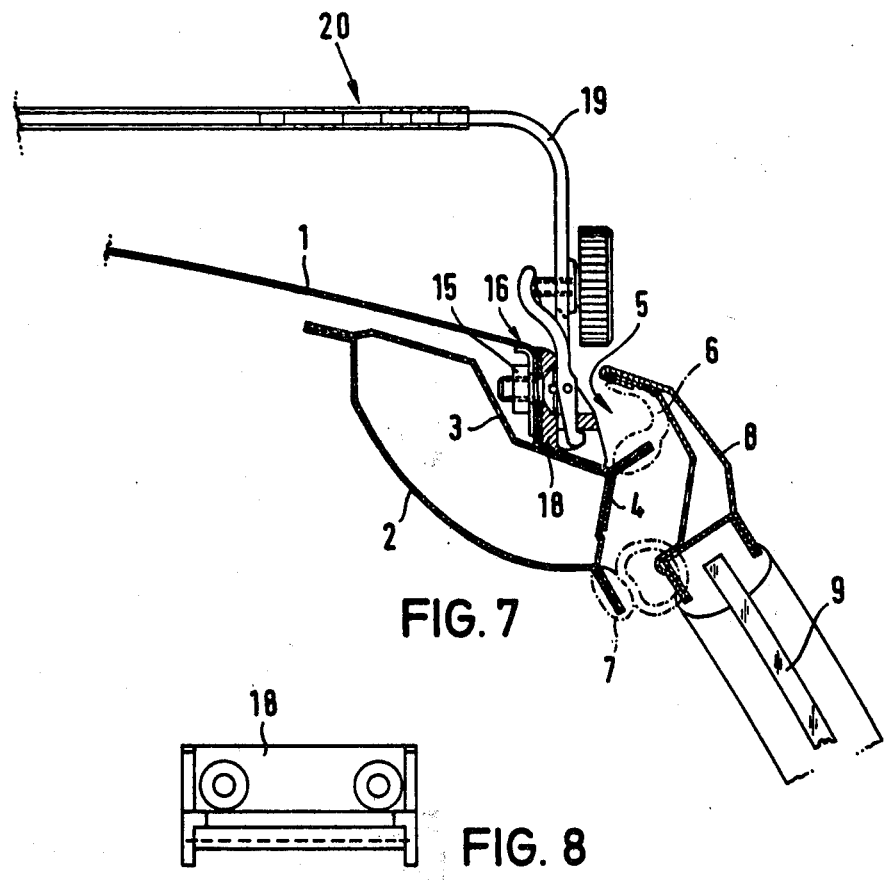
FIG. 7 is a section through the roof-frame in the area of a support for a roof rack.
Figures 9, 10:
FIG. 9 is a view of the foot of the roof-rack support.
FIG. 10 is a view of the plastic filler.

Into these supports 18 can be inserted and located the feet 19 of a roof rack 20 indicated by way of example in FIGS. 7 and 9.

The location or screwing of the foot of the roof rack as shown in the Figures is only one of many possible specific embodiments.

We claim:

1. In a motor car body having a roof plate, internal and external side wall plates defining a side wall of the body fixed to the roof plate, a door pivotally mounted to the side wall, a window mounted in the side wall adjacent the door, and a concealed drip moulding assembly of the type wherein a first portion of the roof plate adjacent the door is folded to define with portions of said side wall a rain channel extending forwardly and rearwardly along the body and covered by an edge portion of the door, the improvement comprising the provision of a reinforcing plate carried on said side wall portion to define with said roof plate portion said rain channel and wherein second portions of the roof plate extending axially beyond said door and over said window are folded essentially identically with said first portions and said reinforcing plate is extended coextensively therewith to define an extended rain channel in axial registration with said window and wherein a cover is mounted over said extended channel between said roof plate and said side wall to mask said extended rain channel.

2. The improvement as defined in claim 1 wherein said cover includes a generally downwardly extending portion fixedly secured to a portion of said side wall.

3. The improvement as defined in claim 1 and further comprising a plurality of axially spaced recesses formed in said roof plate adjacent said folded portions and adapted to receive substantially complementary roof rack support feet.

* * * * *